United States Patent Office 3,776,887
Patented Dec. 4, 1973

3,776,887
FLAME RETARDANT POLYESTER PRODUCTS PREPARED FROM HALO-SUBSTITUTED-ARYL-OXY-ALKANOLS
Charles V. Juelke, Morristown, and Louis E. Trapasso, Westfield, N.J., assignors to Celanese Corporation, New York, N.Y.
No Drawing. Filed Jan. 4, 1972, Ser. No. 215,412
Int. Cl. C08g 17/14, 17/18
U.S. Cl. 260—47 C                          5 Claims

ABSTRACT OF THE DISCLOSURE

Flame retardancy imparted to polyester products by incorporating therin a small but effective amount of a halo-substituted-aryloxy-alkane diol comonomer.

BACKGROUND OF THE INVENTION

In imparting enhanced flame retardancy characteristics to synthetic fibers, films, fabrics, and the like, one must not sacrifice other desirable properties inherent in these materials. For example, any flame retardant for filamentary materials should, preferably, not deleteriously affect the strength of the fiber or of fabric produced therefrom. While numerous halogen- or phosphorus-containing organic and inorganic compounds have been shown to impart certain flame retardancy to synthetic polymers, such as polyester resins, there are generally several drawbacks attending the use of these compounds. For example, the use of up to about 40 percent (by weight of the resin) of certain of these compounds is often required to achieve flame retardancy. While this may be tolerable in the case of certain molding resins, such is generally not the case with synthetic fibers, e.g., polyester staple or monofilament fibers. In fact, the flame retardant used in synthetic polymeric fibers must usually be effective in considerably smaller amounts, generally no greater than about 15% by weight, preferably less than about 10% by weight, based upon the total weight of the retardant and the fiber.

Experience has shown that excessive amounts of retardant can adversely affect the appearance and hand of fabric produced from retardant-treated fibers, loss in the strength and elongation properties of the fiber often results, etc. Of course, discoloration, soiling tendencies, poor color fastness, and the like should not attend the use of any quantity of retardant.

A comprehensive discussion of a very large number of flame retardants for polyester resins may be found in an article entitled "Self-Extinguishing Polyester Resins," by R. C. Nametz, Industrial and Engineering Chemistry, volume 59, No. 5, May 1967, pp. 99–116. The bibliography appended to this article alludes to a host of patents, including the following more relevant but readily distinguishable patents: U.S. Pat. 3,060,146 and British Pat. 924,323.

It is the goal of the present invention to provide flame retardancy in polyester products by treating same with small but effective amounts of certain halogenated organic polyol comonomers, which comomoners while providing desirable flame retardancy do not adversely affect other equally desirable properties of these synthetic polymeric materials.

INVENTION

The present invention relates to polyester fibers, films and fabrics which exhibit flame retardancy by virtue of having been treated with a halogenated organic diol. More particularly, the discovery concerns polyester fibers and films, such as those produced from poly(ethylene terephthalate), containing a small but effective amount of a halogen-substituted-aryloxy alkane polyol, the polyester generally being the polycondensate of a glycol and a dicarboxylic acid or an ester-forming derivative thereof.

Typically, from about 0.1 to about 12.0 percent by weight of 3-(2,4,6-tribromophenoxy)-1,2-propanediol comonomer is incorporated into poly(ethylene terephthalate) pre-polymer, the mixture polymerized and the resulting polyester copolymer extruded into filaments in a conventional manner, the comonomer imparting desirable flame retardancy to the resulting fibrous material. Thus, polyester filaments are produced having very desirable properties of the type generally found in such fibers but possessing an additional and likewise desirable characteristic known as flame retardancy. While from about 0.1 to about 12.0 percent by weight of the comonomer may be used (weight/weight, based upon the total weight of the comonomer and the polyester), preferably from about 2.5 to about 7.5 percent comonomer is employed.

The comonomers contemplated herein have the following formula:

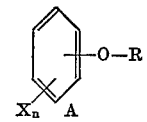

wherein X is halogen, such as bromine and chlorine, and $n$ is an integer from 2 to 5; and R is hydroxyl-substituted alkyl ($C_2$–$C_8$) having 1 or 2 hydroxyl substituents.

While introduction of the comonomer into a poly(ethylene terephthalate) pre-polymer is preferred, the comonomer may, alternatively, be admixed in the desired amount with a poly(ethylene terephthalate) melt. In any case, when using a comonomer of the type contemplated herein in which but one hydroxyl-substituent is present on the alkyl (R) moiety, it is desirable to introduce the comonomer nto the poly(ethylene terephthalate) after the latter has been polymerized. In other words, good results are realized by introducing the comonomer into the polyester polymer toward the end of the polycondensation stage when the polymer has reached or is near the desired intrinsic viscosity.

Illustrative comonomers include the following:

3-(2,4,6-trichlorophenoxy)-1,2-propanediol;
2-(2,4,6-tribromophenoxy)-1,3-propanediol;
3-(3,5-dibromophenoxy)-1,2-butanediol;
3-(2,4,6-tribromophenoxy)-1,2-heptanediol;
7-(2,4,6-tribromophenoxy)-1,2-heptanediol;
3-(2,3,4,5-tetrabromophenoxy)-1,2-pentanediole;
3-(2,3-dichloro-4,5,6-tribromophenoxy)-1,2-propanediol;

and the like. Also, mixtures of these comonomers are contemplated herein, the total weight percent of the several comonomers taken togeher being, of course, in the 0.1 to 12.0 percent range, preferably 2.5 to 7.5, as indicated hereinabove.

The term "polyester" as used herein is deemed to include any highly polymeric linear ester obtained by heating one or more glycols of the series $HO(CH_2)_dOH$ wherein $d$ is from 2 to 10 with a dicarboxylic acid (preferably terephthalic acid) or an ester-forming derivative thereof; a "highly polymeric linear ester" is a polyester capable of molecular orientation as shown by characteristic X-ray patterns, by drawing or rolling. Examples of ester-forming derivatives of terephthalic acid include its aliphatic, cycloaliphatic, and aryl esters and half esters; its acid halides; and its ammonium and amine salts. Examples of the aforementioned glycols include ethylene glycol, trimethylene glycol, tetramethylene glycol, hexamethylene glycol, decamethylene glycol, and the like. The preferred polyesters used in the process of this invention are comprised of recurring structural units of the formula:

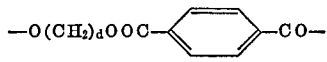

wherein $d$ is an integer of from 2 to 10 (preferably from 2 to 4); these polyesters may be made by reacting a glycol of the formula $HO(CH_2)_dOH$ (defined above) with terephthalic acid, the esters thereof, or other terephthalic acid bodies which are capable of reacting with said glycols to form glycol esters (see, e.g. U.S. Pat. 2,465,319 of Whinfield and Dickson). The most preferred polyester used in the process of this invention is selectd from the group consisting of poly(ethylene terephthalate), poly(trimethylene terephthalate), and poly(tetramethylene terephthalate).

If desired, small but effective amounts of certain "synergists" may also be used, in conjunction with the comonomer of the present invenion, to assist the latter in imparting flame retardancy characteristics to the fibrous polyester materials. While the comonomer additives of the present invention do not require synergists to be effective, it has been found that less than about 4 percent by weight of these synergists, preferably from about 0.5 to about 2.5 percent by weight, based upon the total weight of the polyester-comonomer-synergist composition, can provide effective assistance. Typical synergists within the purview of the present invention are: antimony oxide, zinc oxide, ethylene-bis-diphenylene phosphine oxide, triphenyl melamine, and the like.

The polyester fiber contemplated herein generally is a continuous filament having a denier in the range of about 0.5 to about 200 denier per filament, preferably from about 1.0 to about 50 denier per filament. Of course, staple fibers, tow, yarn, and fabric of enhanced flame retardancy may be produced from the novel copolymeric fibrous materials of the present invention. Likewise, various films exhibiting the flame retardancy herein described are readily produced.

Among other advantages of the comonomers of the type contemplated herein are: ability to mix more uniformly throughout the polyester polymer; higher concentrations can be used without adversely affecting stability of threadline at spinneret in melt spinning; reduction of filtration and pack pressure build-up problems; and the like.

EXAMPLES

The products and processes of the instant invention will be better understood from the examples which follow, which examples are illustrative only and not intended to unduly limit the scope of the invention. Unless otherwise indicated, all percentages and parts are by weight and all temperatures are in degrees centigrade.

Example I 2,4,6-tribromophenol (82.5 grams; 0.25 mole) is dissolved in 50 milliliters of hot ethanol and heated at reflux until the material is all dissolved. Sodium hydroxide (1.0 gram; 0.025 mole) in 5.0 milliliters of water is then added to this solution and refluxing continued for another 15 minutes, at which time 18.5 grams (0.25 mole) of glycidol is added dropwise to the refluxing solution, refluxing being then continued for a period of 5 more hours. Some 40 milliliters of the alcohol is then removed and the reaction mixture cooled to yield a yellowish white precipitate. This product, viz., 3-(2,4,6-tribromophenoxy)-1,2-propanediol, can be purified by recrystallization from ethanol.

Example II

To a three-neck flask is added 200 grams of bis-hydroxyethyl terephthalate (polyester pre-polymer) and 0.2 gram of antimony oxide ($Sb_2O_3$). The resulting mixture is then sparged with nitrogen for one (1) hour. While continuing the nitrogen sparge, the mixture is then heated to 190° C. and 10 grams of solution (ca. 70° C.) of ethylene glycol and 5.0 grams of the 3-(2,4,6-tribromophenoxy)-1,2-propanediol (cf. Example I) comonomer is then added. Heating is continued to 290° C., at which point the nitrogen sparge is discontinued and vacuum is applied immediately. After the reaction mixture becomes quite viscous and both heat and vacuum are turned off, the nitrogen sparge is resumed. The resulting poly(ethylene terephthalate) copolymer has a melt extrusion temperature of 280° C., an intrinsic viscosity value in 10/7 phenol/trichlorophenol of 0.55 deciliters/gram, and the color thereof is white. The comonomer is present in the copolymer in a concentration of about 2½% (wt./wt.).

Example III

To a three-neck flask having a nitrogen gas inlet, thermometer, stirrer and distillation head is added 200 grams of bis-hydroxyethyl terephthalate (polyester pre-polymer) and 0.2 gram antimony oxide ($Sb_2O_3$) catalyst and the mixture sparged with nitrogen gas for one hour, at which time heating is started and continuously increased; when the bis-hydroxyethyl terephthalate is melted (ca. 190° C.) 20 grams of a solution of ethylene glycol (ca. 70° C.) and 15 grams of 3-(2,4,6-tribromophenoxy)-1,2-propanediol (recrystallized product of Example I, above) is added. At 190° C. ethylene glycol starts distilling off. At 290° C. the nitrogen sparge is discontinued and vacuum is immediately applied. When the reaction mixture becomes viscous, vacuum is shut off, nitrogen sparge is resumed, and heating discontinued. The resulting poly(ethylene terephthalate) copolymer has a melt extrusion temperature of 280° C., an intrinsic viscosity value in 10/7 phenol/trichlorophenol of 0.57 deciliters/gram, and the color thereof is white. The comonomer is present in the copolymer in a concentration of about 7½% (wt./wt.).

Example IV

Bis-hydroxyethyl terephthalate BHET (785 grams, including a small amount of the first stage catalyst, viz., magnesium carbonate) is charged to a polyester autoclave and melted. To the melted BHET (pre-polymer) is added 0.24 gram of $Sb_2O_3$, 0.36 gram of trimethylphosphite (TMP) and 30 grams of recrystallized comonomer of Example I, above. While maintaining the mixture molten (ca. 280° C.) it is stirred for 90 minutes, and during the last fifteen minutes of this period ethylene glycol is taken off. The blend is then put under vacuum and vacuum letdown started. A viscous, clear poly(ethylene terephthalate) copolymer is collected which has a melting point of 250° C.

Example V

Example IV is repeated in every essential respect with the exception that 0.60 gram of trimethylphosphite is introduced and the resulting copolymer has an intrinsic viscosity of .641 and a melting point of 253.0.

The polyester-comonomer products of the above examples are tested by the following process: about one (1) gram of hoseleg control [from poly(ethylene terephthalate) polymer fiber] is folded into a compact wad and held with tweezers in the flame of a cigarette lighter. The control fabric ignites quickly and continues to burn with a smoky flame until it is nearly all consumed. On the other hand, a similar hoseleg from the comonomer-poly(ethylene terephthalate) products of the above examples is ignited only with difficulty and the first burning drop carries the flame away, thus indicating superior flame resistance.

Pursuant to statutory requirements, there are described above the invention and what are now considered its best embodiments. It should be understood, however, that the invention can be practiced otherwise than as specifically described, within the scope of the appended claims.

What is claimed is:

1. A flame retardant polyester copolymeric fiber containing by weight from about 0.1 to about 12.0 percent of a reacted comonomer of the formula

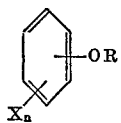

wherein X is halogen, and $n$ is an integer from 2 to 5 and R is hydroxyl-substituted alkyl ($C_2$–$C_8$) having 1 or 2 hydroxyl substitutes, the weight percentage of comonomer being based upon the total weight of said copolymer, and wherein said polyester comprises recurring structural units of the formula

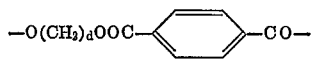

wherein $d$ is an integer of from 2 to 10.

2. The product of claim 1 wherein the polyester is poly(ethylene terephthalate).

3. The product of claim 2 wherein the comonomer is 3-(2,4,6-tribromophenoxy)-1,2-propanediol.

4. The product of claim 1 wherein the comonomer is present in the concentration of about 2.5 to about 7.5 percent by weight.

5. The product of claim 3 wherein the comonomer is present in the concentration of about 2.5 to about 7.5 percent by weight.

References Cited
UNITED STATES PATENTS

| | | | |
|---|---|---|---|
| 3,060,146 | 10/1962 | Wismer et al. | 260—45.4 |
| 2,621,168 | 12/1952 | Ross et al. | 260—75 |
| 2,799,694 | 7/1957 | Ross et al. | 260—453 |
| 3,520,951 | 7/1970 | Kramm et al. | 260—869 |

LESTER L. LEE, Primary Examiner

U.S. Cl. X.R.

260—Dig. 24